Aug. 13, 1929 D. F. YOUNGBLOOD Re. 17,403

LOCKING AND OPERATING SYSTEM FOR CELL DOORS

Original Filed March 25, 1926 9 Sheets-Sheet 1

Witnesses

C. L. McDonald

E. N. Lovewell

Inventor

David F. Youngblood

By

E. G. Siggers

Attorney

Aug. 13, 1929. D. F. YOUNGBLOOD LOCKING AND OPERATING SYSTEM FOR CELL DOORS Re. 17,403

Original Filed March 25, 1926 9 Sheets-Sheet 2

Witnesses

C. L. McDonald.

E. N. Lovewell

Inventor

David F. Youngblood

By

C. L. Figgers

Attorney

Aug. 13, 1929. D. F. YOUNGBLOOD LOCKING AND OPERATING SYSTEM FOR CELL DOORS Re. 17,403
Original Filed March 25, 1926 9 Sheets-Sheet 3
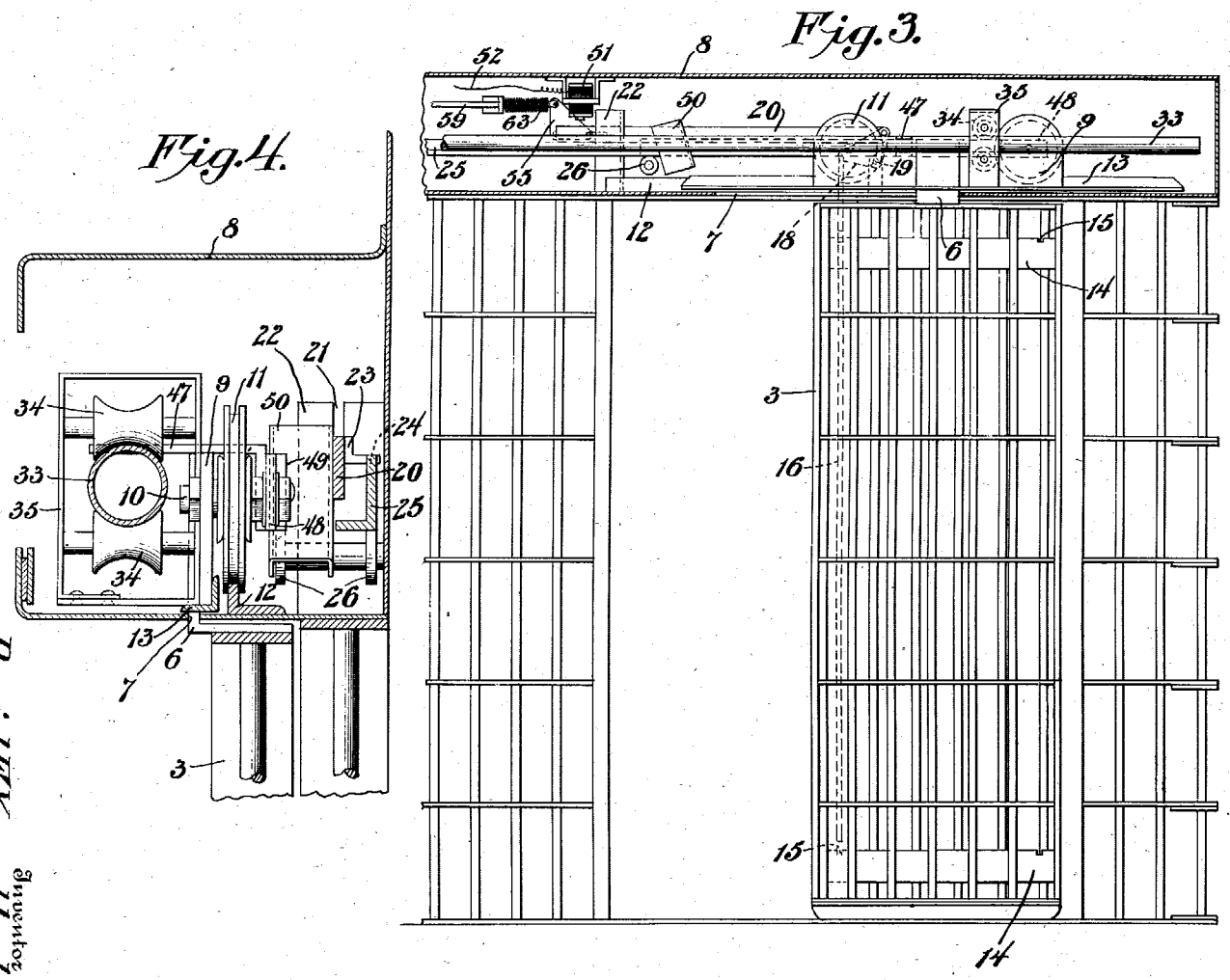
Witnesses
C. L. McDonald.
E. N. Lovewell
Inventor
David F. Youngblood
By
E. G. Siggers
Attorney Aug. 13, 1929. D. F. YOUNGBLOOD
LOCKING AND OPERATING SYSTEM FOR CELL DOORS Re. 17,403
Original Filed March 25, 1926 9 Sheets-Sheet 4
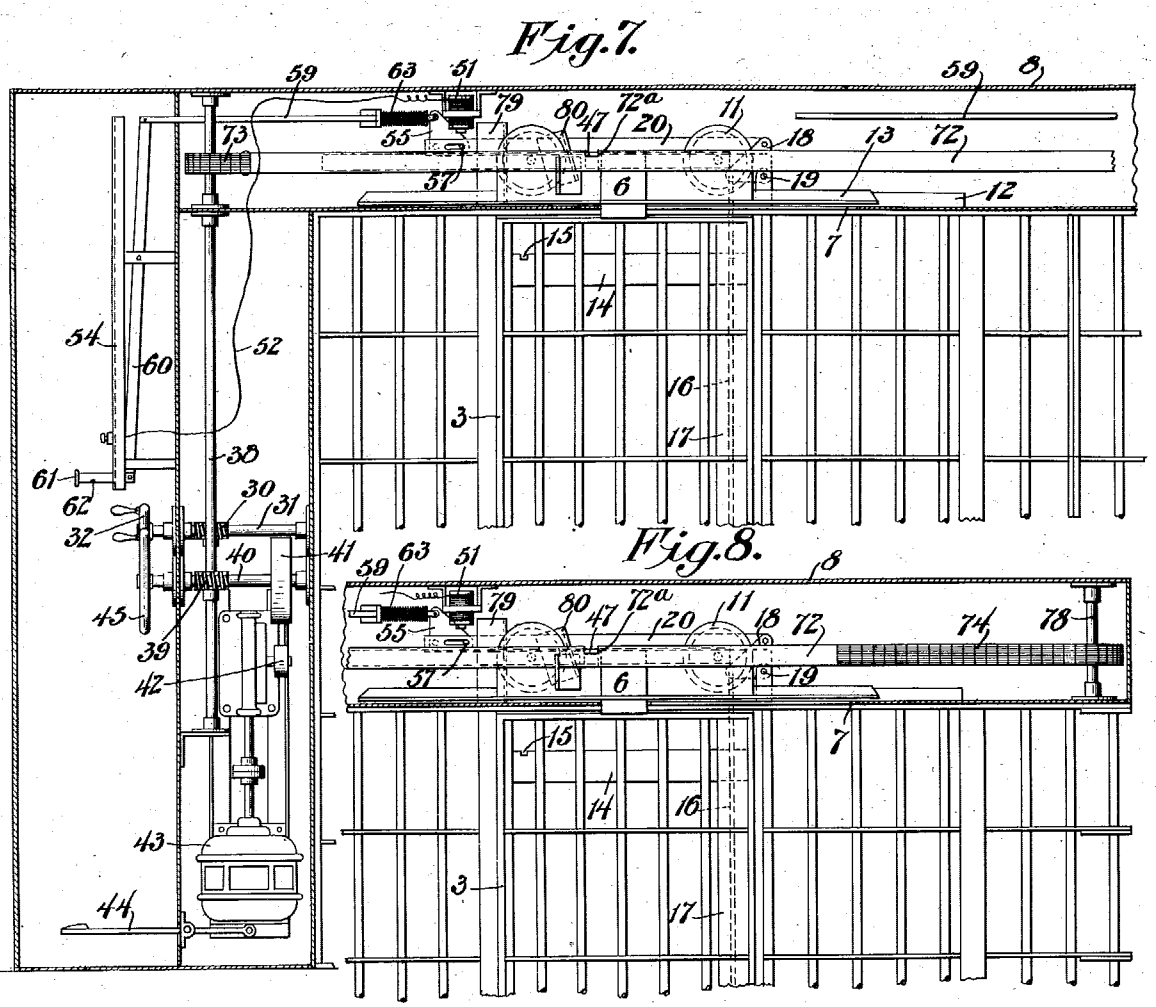
Witnesses
C. L. McDonald
E. N. Lowrwell
Inventor
David F. Youngblood
By
E. G. Siggers
Attorney Aug. 13, 1929. D. F. YOUNGBLOOD
LOCKING AND OPERATING SYSTEM FOR CELL DOORS Re. 17,403
Original Filed March 25, 1926 9 Sheets-Sheet 5
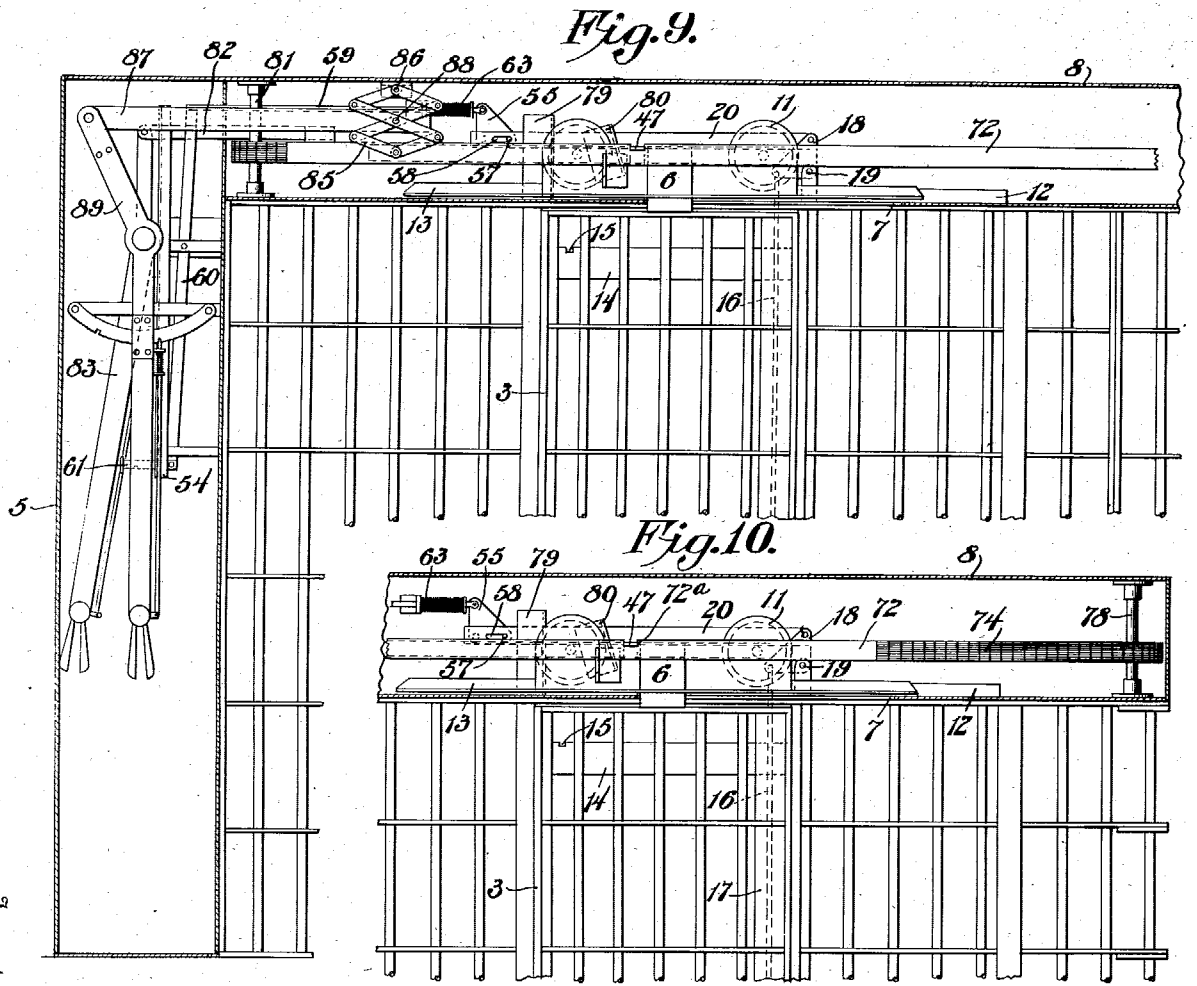
Witnesses
C. L. McDonald
E. N. Lovewell
Inventor
David F. Youngblood
By E. G. Siggers
Attorney Aug. 13, 1929. D. F. YOUNGBLOOD
LOCKING AND OPERATING SYSTEM FOR CELL DOORS Re. 17,403
Original Filed March 25, 1926 9 Sheets-Sheet 6
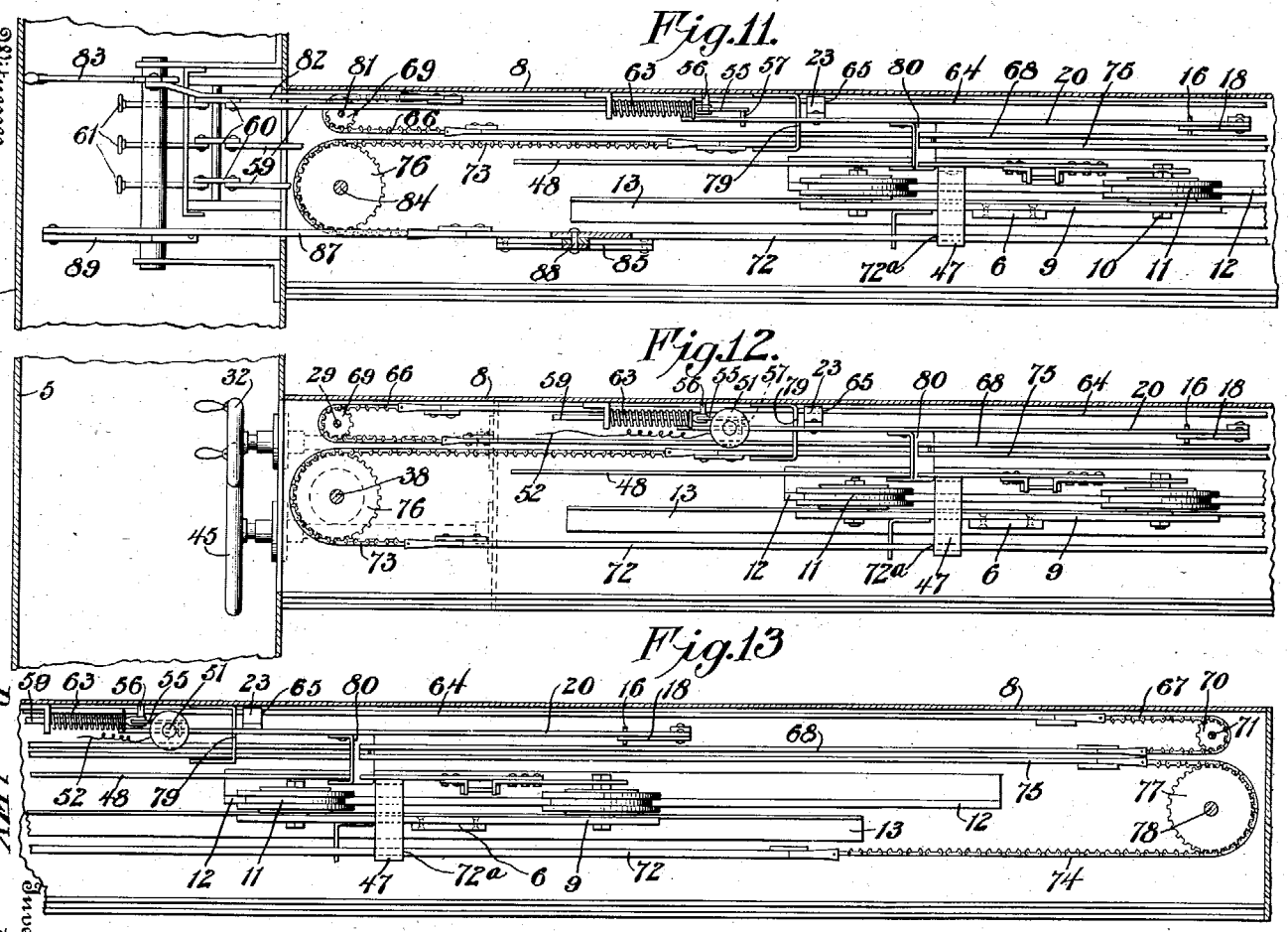
Witnesses
Chas. L. McDonald
E. N. Lovewell
Inventor
David F. Youngblood
By
C. G. Siggers
Attorney Aug. 13, 1929. D. F. YOUNGBLOOD
LOCKING AND OPERATING SYSTEM FOR CELL DOORS Re. 17,403

Original Filed March 25, 1926 9 Sheets-Sheet 7

Witnesses
L. McDonald
E. N. Lovewell

Inventor
David F. Youngblood
By
E. G. Siggers
Attorney

Aug. 13, 1929. D. F. YOUNGBLOOD
LOCKING AND OPERATING SYSTEM FOR CELL DOORS Re. 17,403

Original Filed March 25, 1926 9 Sheets-Sheet 8

Witnesses

C. L. McDonald
E. N. Lovewell

Inventor

David F. Youngblood

By

E. G. Siggers

Attorney

Aug. 13, 1929. D. F. YOUNGBLOOD LOCKING AND OPERATING SYSTEM FOR CELL DOORS Re. 17,403

Original Filed March 25, 1926 9 Sheets-Sheet 9

Witnesses

C. L. McDonald.
E. N. Lovewell

Inventor
David F. Youngblood

By
E. G. Siggers

Attorney

Reissued Aug. 13, 1929. Re. 17,403

UNITED STATES PATENT OFFICE.

DAVID FRANKLIN YOUNGBLOOD, OF SAN ANTONIO, TEXAS.

LOCKING AND OPERATING SYSTEM FOR CELL DOORS.

Original No. 1,611,260, dated December 21, 1926, Serial No. 97,281, filed March 25, 1926. Application for reissue filed December 19, 1928. Serial No. 327,163.

This invention relates to a locking and operating system for cell doors, whereby the latter may be individually or collectively controlled by a prison attendant from a control box, usually located at the end or in front of the row of cells with which the system is associated.

The system to which the present invention relates is similar in many respects to that disclosed in U. S. Patent No. 1,269,244 issued to me June 11, 1918, but embodies a number of improvements thereon.

In the majority of large city jails and penitentiaries, it is usually desired to have a large number of cells, frequently sixteen or more, in one row. With the ordinary lever and straight travel bar, as disclosed in the abovementioned patent, it is not feasible to operate more than about eight doors.

One of the principal objects of the present invention, therefore, is to provide an improved system which may be successively used to operate, lock and unlock the doors of any desired number of cells in one row.

Other important objects of the invention will be explained in the following detailed description, taken in connection with the accompanying drawings, which illustrate various embodiments of the invention.

In the drawings:

Figure 3 is a similar view of the rear part of the mechanism, showing the rear cell door open.

Figure 4 is a vertical transverse section through the casing and the mechanism housed therein.

Figure 7 is a view similar to Figure 2, but showing a modified construction.

Figure 8 is a side elevation of the rear portion of the mechanism shown in Figure 7.

Figure 9 is a view similar to Figure 7, but showing a further modification.

Figure 10 is a side elevation of the rear portion of the mechanism shown in Figure 9.

Figure 11 is a plan view of the mechanism shown in Figure 9.

Figure 12 is a plan view of a portion of the mechanism shown in Figure 7.

Figure 13 is a plan view of the mechanism shown in Figure 8.

Figure 1:
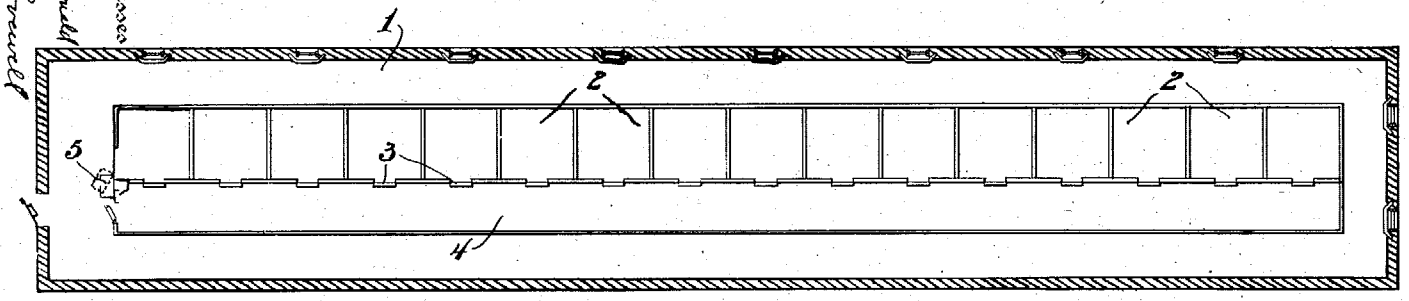
Figure 1 is a diagrammatic plan view of a series of cells to which the improved mechanism is applied, the walls of the building being shown in section.
Figure 5:
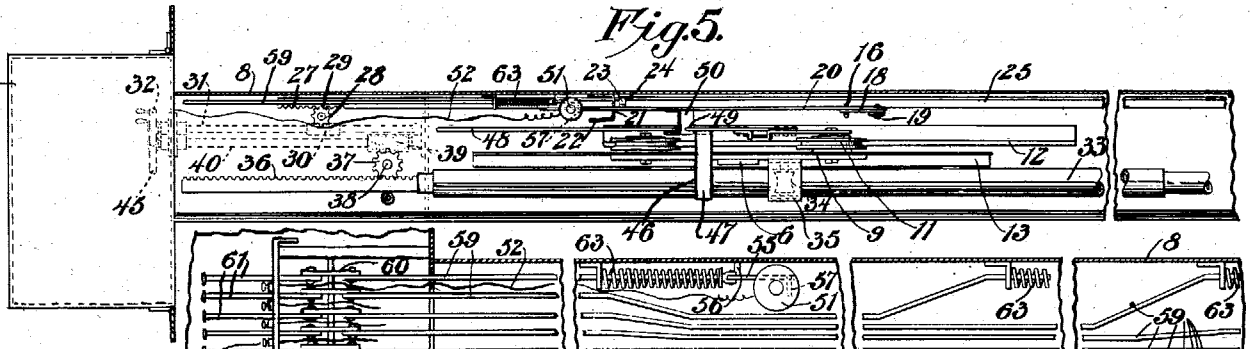
Figure 5 is a plan view of the mechanism for locking or unlocking and opening or closing a cell door.
Figure 6:
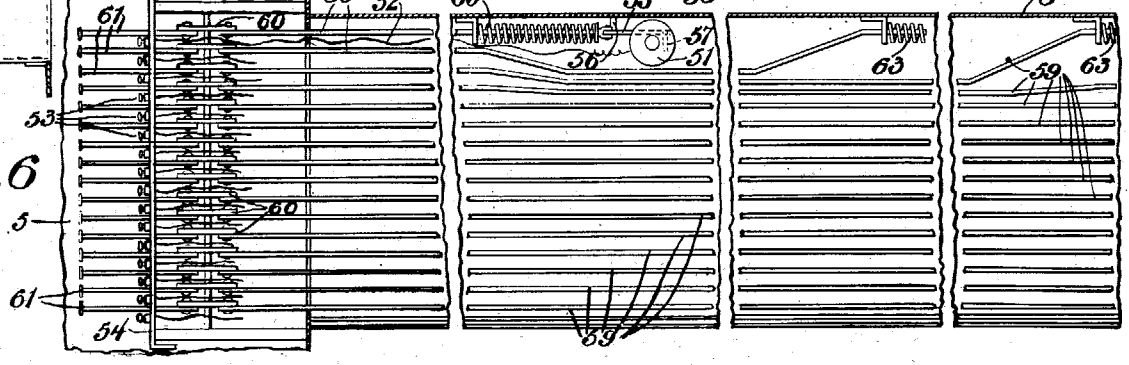
Figure 6 is a plan view of the selective mechanism for controlling the doors individually.

The various embodiments of the invention are illustrated in connection with a prison having a cell room 1, within which is located a row of cells 2, each having a door 3 opening into a corridor 4. The cell doors are all controlled from a box 5 which, in the form illustrated in Figure 1, is located at the front end of the row of cells.

As illustrated in Figures 2 to 5 inclusive, each door 3 is supported by means of a hanger 6 secured to its upper end, and extending upwardly through a slot 7 in a casing 8 extending longitudinally of the row of cells above the doors. The hanger 6 is secured to a carriage 9, which is located within the casing 8, and has stub axles 10 secured thereto with the wheels 11 journaled thereon, and adapted to ride on a track 12 conveniently made of a structural angle. A bar 13 is secured to the carriage 9 within the casing and covers the slot 7 to prevent unauthorized access to the mechanism.

Each door 3 is provided near the top and bottom with keepers in the form of bars 14, each having notches 15 for the reception of a lock bar 16, movable through a suitable protecting casing 17, such as is frequently used in jail door constructions and requires no special description. The purpose of the casing 17 is, of course, to shield the lock bar 16 from access by prisoners.

Each lock bar 16 is hung from one end of a bell crank lever 18, which is shown as in the form of a triangular plate, although such particular construction is not obligatory. The lever 18 is pivotally supported by a pivot pin 19 within the casing 8, and the end of the lever opposite to that connected to the lock bar 16 is pivotally connected to one end of a latch 20, which is supported and guided in a slot 21, formed in a bracket 22 secured to the side of the casing 8. A lug 23 is secured to one side of the latch 20, and the latch normally rests by gravity at the bottom of the slot 21, with the lug 23 engaging a notch 24 formed in a bar 25, which extends for the entire length of the row of cells, and is supported for longitudinal movement upon rollers 26. When the lug 23 engages the notch 24, and the bar 25 is stationary, the latch 20 is held against longitudinal movement, the lever 18 remains stationary with the lock bar 16 engaging one of the notches 15 and locking the door 3 either in open or closed position.

Figure 2:
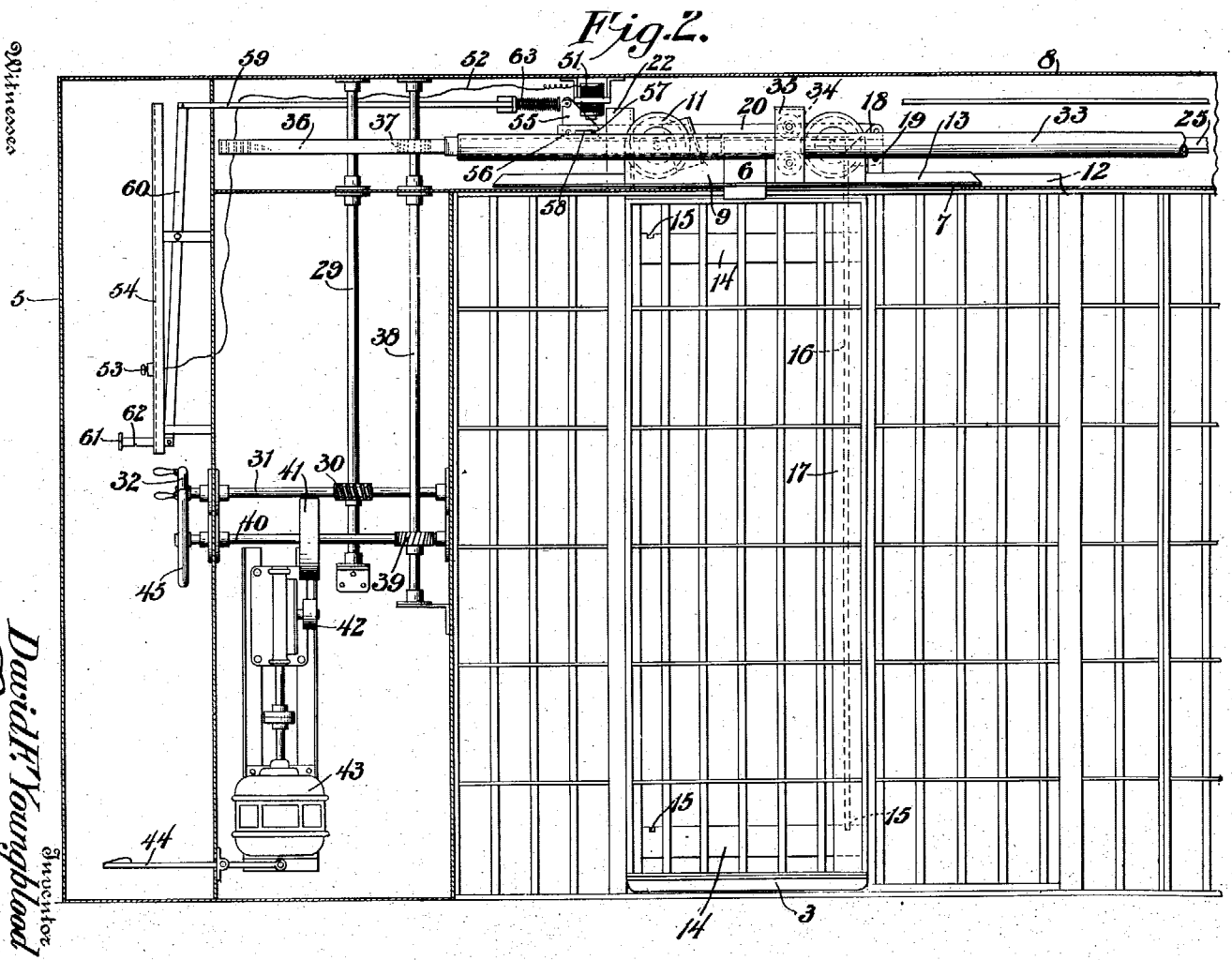
Figure 2 is a longitudinal vertical section through the front portion of the casing which houses the door locking and controlling mechanism, the first cell and the front part of the operating mechanism being shown in elevation.
Figure 14:
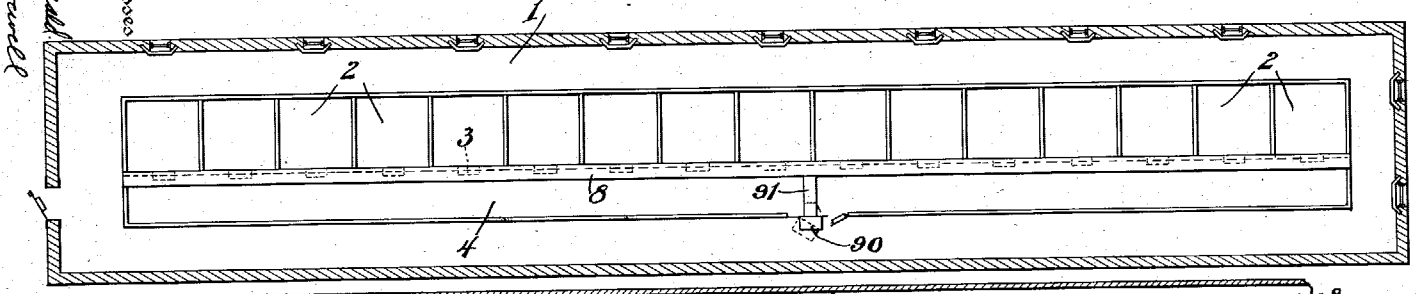
Figure 14 shows a plan of a cell room with the control box located at one side thereof, midway of the row of cells.
Figure 17:
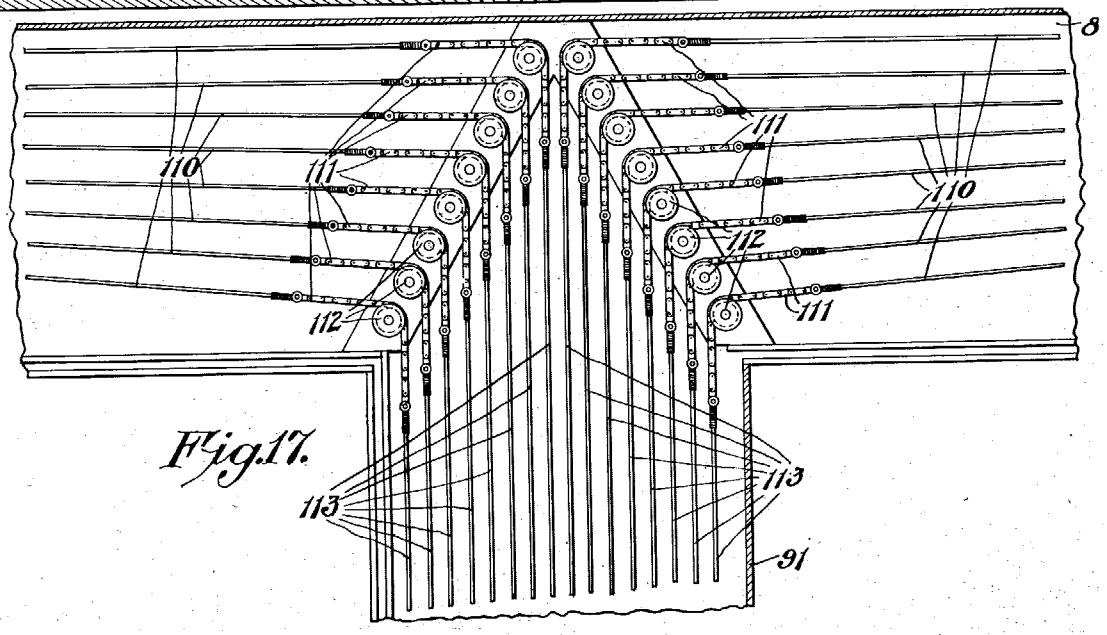
Figure 17 is a plan view of the selective means used in connection with the mechanism illustrated in Figures 15 and 16.

The front end of the bar 25 is formed with a rack 27, which is engaged by a pinion 28 at the upper end of a vertical shaft 29. The shaft 29, as show in Figure 2, is connected by worm gearing 30 to a horizontal shaft 31, which extends forwardly into the control box 5, and is provided with a hand wheel 32 for operating the same. It will be understood, therefore, that when all of the latches 20 are in normal position, with the lugs 23 engaging the notches 24, the hand wheel 32 may be rotated to move the bar 25 longitudinally, thereby rocking the levers 18, and simultaneously locking or unlocking all of the cell doors. Moreover, the worm gearing 30 is self-locking so that the locking bar 16 cannot be moved without rotating the hand wheel.

When all of the cell doors are unlocked, they may be all opened or closed simultaneously by mechanism which is also controlled from the box 5, so that the keeper does not have to go in the corridor among the released prisoners. This mechansm is shown in Figs. 2 to 5 as including a longitudinal tubular shaft or bar 33, which extends from end to end of the row of cells, and is supported and guided between concave rollers 34, mounted in a bracket 35, secured to the carriage 9. The front end of the tubular shaft or bar 33 has a rack 36 connected therewith which meshes with a pinion 37 secured to the upper end of a vertical shaft 38. This shaft 38 is connected by worm gearing 39 to a horizontal shaft 40 which is provided with a friction pulley 41, adapted to be engaged by a drive pulley 42, driven by an electric motor 43. This motor is mounted for vertical movement, and may be raised by means of a foot lever 44 within the box 5, so as to engage the pulley 42 with the pulley 41, thereby moving the tubular shaft or bar 33 longitudinally. It is to be understood that the motor 43 is reversible, so that the tubular shaft or bar 33 may be moved in either direction to open or close the cell doors. The shaft 40 is also provided with a hand wheel 45, whereby it may be manually rotated in case the electric current should fail.

In order to connect the tubular shaft or bar 33 with the respective cell doors, it is provided with a notch 46 above each door, the notch being normally engaged by an arm 47 secured to a bar 48, which is pivotally connected to one of the stub axles 10. The bar 48 extends through a slot 49 in a bracket 50, which is secured to the latch 20. It will be understood, therefore, that the arm 47 normally rests in the notch 46, but will be raised out of the notch whenever the latch 20 is lifted to disengage the lug 23 from the notch 24. Whenever it is desired, therefore, to leave one of the cell doors locked while the remaining doors are opened, the latch 20 above said door is lifted, so that said door will remain locked when the bar 25 is moved longitudinally to unlock the other doors. At the same time, the arm 47 above said door is lifted from the notch 46, thus permitting all of the unlocked doors to be opened, while the other door remains closed.

For lifting the latches 20, it is preferred to provide electro-magnetic means such as a solenoid or electro-magnet 51, shown diagrammatically above the front end of each latch. Each solenoid or electro-magnet is connected to an individual circuit 52, which may be closed by means of a push button 53, located in a panel 54 supported within the control box 5. Mechanism is also provided for actuating the latches 20 manually in case of failure of the electric current. This manually operable means comprises a bell crank 55 for each latch, said bell crank being mounted on a pivot 56, and having a pin 57 engaging a slot 58 in the latch. The slot 58 is provided to allow sufficient longitudinal movement of the latch to lock or unlock the door in case it is desired to do so. The end of the bell crank 55, remote from the pin 57, is connected by a rod 59 to an individual lever 60, pivotally mounted in the box 5 behind the panel 54 and provided at its lower end with a pivoted pusher bar 61 having a notch 62, to engage the bottom edge of a slot in the panel, so that it may be latched to hold the corresponding latch 20 in raised position. Each rod 59 has an expansile coil spring 63 mounted thereon, and adapted to restore the bell crank 55 and latch 20 to normal or latched position as soon as the latch 61 is released.

In the form shown in Figures 7, 8, 12, 13 and 18, each latch 20 is lifted in the same manner as heretofore described, either by means of a solenoid 51, or by the actuation of one of the levers 60. For moving the latches longitudinally, however, a metallic strip 64 is provided in place of the bar 25, this strip being provided with notches 65 for engagement by the lugs 23 on the respective latches. The strip 64 is connected at its ends by sprocket chains 66 and 67 respectively, to the ends of a similar strip 68 to form an endless element, with the sprocket chains 66 and 67 passing over sprocket wheels 69 and 70, respectively. The sprocket wheel 70 is mounted on a vertical shaft 71 at the rear end of the casing 8, while the sprocket wheel 69 is secured to the shaft 29, which is actuated in the same manner as hereinbefore described to move the metallic strip 64 and the latches engaged therewith in one direction or the other.

In Figs. 7 and 8, the mechanism for opening or closing the doors comprises a metallic strip 72 in place of the bar or tubular shaft 33, this strip being provided with notches 72[a] adapted to be engaged by the arms 47 connected with the respective doors. The strip 72 is connected at its ends by sprocket chains 73 and 74, respectively, to the ends of a similar strip 75 to form an endless element, with said sprocket chains passing over sprocket wheels 76 and 77, respectively. The sprocket wheel 77 is mounted on a vertical shaft 78 at the rear end of the casing 8, while the sprocket wheel 76 is secured to the shaft 38, which is actuated in the manner hereinbefore described for opening or closing the doors.

The bracket 79 is made somewhat wider than the bracket 22, and is provided with slots for guiding and supporting strips 68 and 75, as well as the latch 20. The bracket 80 also is provided with slots for receiving the strips 68 and 75, as well as the bar 48.

Figure 18:
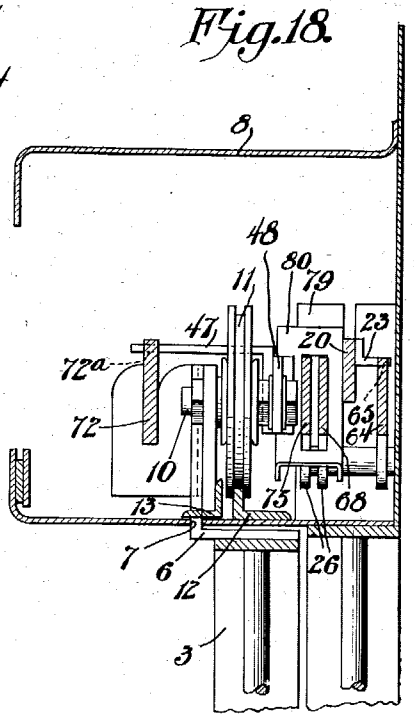
Figure 18 is a transverse section through the door controlling mechanism as used in any of the forms illustrated in Figures 7 to 17 inclusive.
Figure 15:
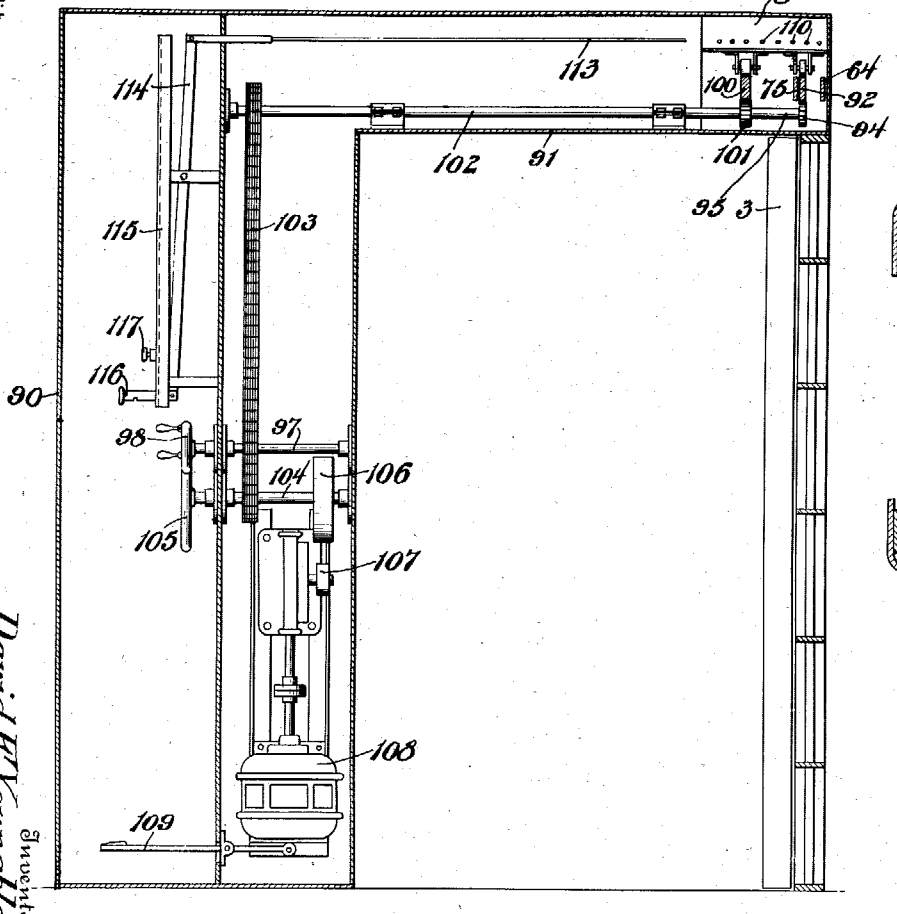
Figure 15 is a vertical section through the control box shown in Figure 14, and illustrating the connection of the control mechanism with the door operating mechanism.
Figure 16:
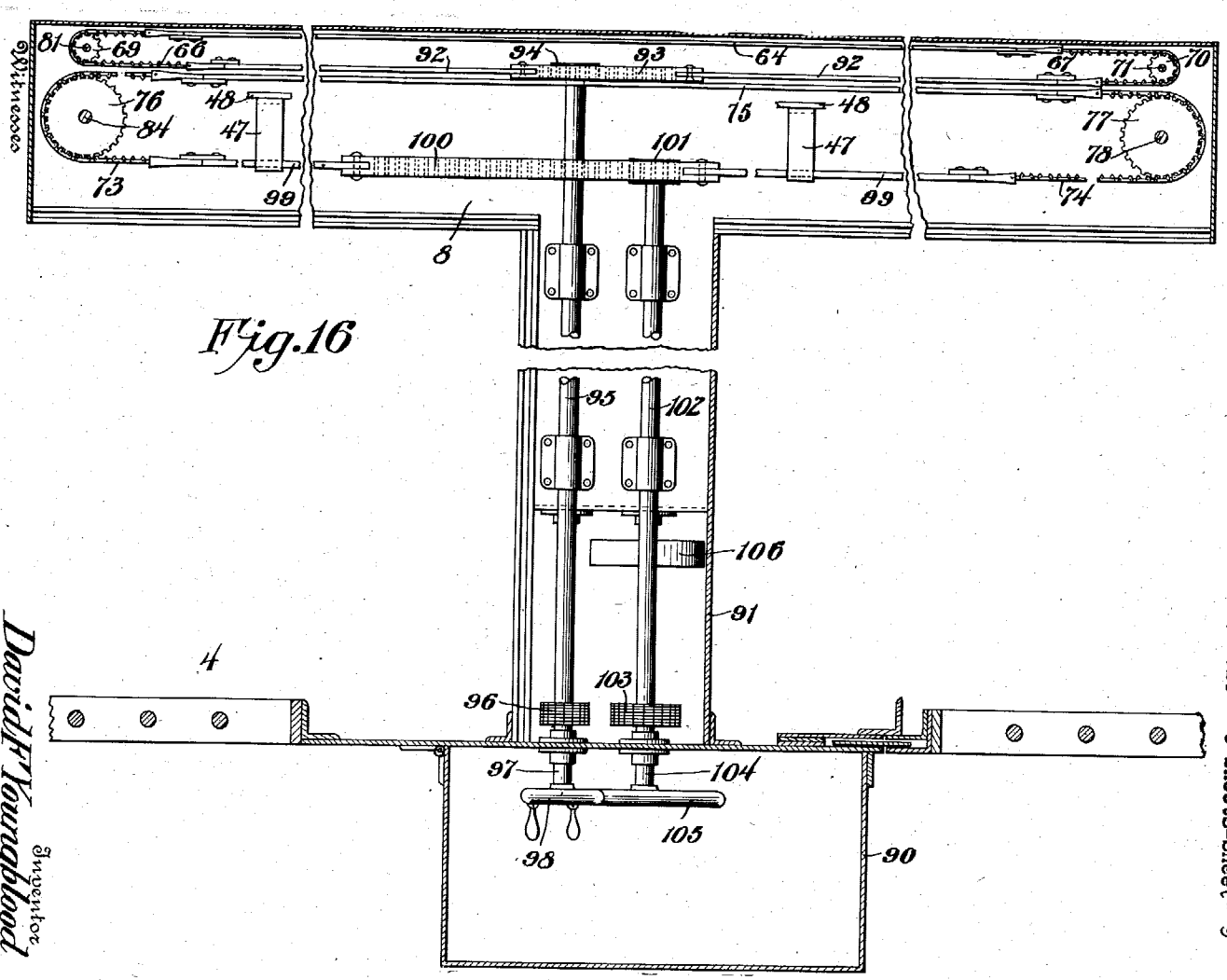
Figure 16 is a plan view of the mechanism shown in Figure 15, the casing and the wall in front of the corridor being shown in section.

In the modification shown in Figures 9, 10 and 11, which is also used in connection with the parts shown in Figures 13 and 18, electrical power is dispensed with. The sprocket wheel 69 is mounted on a short shaft 81 in the front end of the casing 8, and the strip 64 is moved longitudinally in either direction by means of a link 82, which connects the same to a hand lever 83, suitably mounted within the control box 5. The sprocket wheel 76 is similarly mounted on a short shaft 84 in the front end of the casing 8, and the strip 72 is moved longitudinally through the medium of lazy tongs 85, connected at one end to said strip, and at the other end to a pivot pin 86 secured in the upper part of the casing 8. A link 87 is connected at one end, as at 88, to an intermediate pivot of the lazy tongs, and is connected at its other end to a hand lever 89 suitably mounted within the control box 5. By means of the lazy tongs, the doors have a comparatively wide range of movement.

In the form illustrated in Figures 14, 15, 16, and 17, which is also adapted to be used with the mechanism shown in Figure 18, all of the mechanism is controlled from a box 90, located in front of the row of cells, and substantially midway between the ends thereof. A casing 91 extends from the box 90 to the casing 8. In this form, the strip 68 is replaced by a strip 92 formed in two sections, connected together by a rack bar 93, which meshes with a gear 94 secured to the end of a shaft 95 journaled within the casing 91. The outer end of the shaft 95 is connected by sprocket gearing 96 to a shaft 97 mounted within the box 90, and having a hand wheel 98 secured thereto for actuating the same. In this form, the strip 72 is replaced by a strip 99, which is formed in two sections connected by a rack bar 100 which meshes with a gear 101, secured to a shaft 102 journaled within the casing 91. The outer end of the shaft 102 is connected by sprocket gearing 103 to a shaft 104 mounted within the box 90, and provided with a hand wheel 105. A friction pulley 106 is also secured to the shaft 104, and is adapted to be actuated in the same manner as the pulley 41, by means of a pulley 107 carried by an electric motor 108, which is adapted to be moved vertically by means of a foot lever 109, so as to drive the shaft 104, and thereby open or close the cell doors. In this form, instead of the rods 59 for lifting the latches, rods 110 are provided which extend toward the center of the casing 8, and are there connected with the ends of the respective sprocket chains 111 which pass over sprocket wheels 112, and are connected at their other ends to rods 113, extending through the casing 91 and connected with levers 114, which are mounted in the same manner as the levers 60 behind a panel 115, within the box 90, and provided at their lower ends with pusher bars 116. Push buttons 117 are also provided in the panel 115, and have the same function as the push buttons 53.

From the foregoing description, it will be understood that I have provided improved mechanism which may be used for controlling and actuating any number of cell doors, either individually or collectively, and by either electric or manual power. All of the mechanism may be actuated from a single control station. The tubular shaft or bar 33 is of strong construction, and is guided between the rollers 34, so that it will not buckle no matter how much power it is necessary to exert in order to open the doors. Where the metallic strips 64, 68, 82, 75, 92 or 99 are used, they cannot buckle, because they are actuated by pulling through the medium of the sprocket chains 66, 67, 73 and 74. The arrangement shown in Figures 14 to 17 inclusive, makes it possible to pull half the doors from one side, and push or pull the other half from the other side in a long row of cells. The position of the controlling mechanism in front of the cells affords the prison keeper an opportunity to see into all of the cells while opening or closing the doors. In small town or county jails, where electric current is frequently unavailable, it may be preferred to use the hand lever construction, as shown in Figures 9 and 11. By means of the construction shown in the drawings, all of the cell doors may be opened or closed, and locked or unlocked simultaneously, or any number or combination of selected doors may be operated simultaneously while the others remain fixed.

The various embodiments of the invention have been illustrated in connection with the most common type of prison construction, in which the cells are equipped with sliding doors, but it is apparent that the invention may be readily adapted for use in connection with any other type of prison construction. It is also apparent that various modifications may be made in the general arrangement of the mechanism, and in the specific details thereof, without any material departure from the salient features of the invention as defined in the claims.

What I claim is:—

1. In a locking and operating system for cell doors, a locking bar for each door, a latch connected with each locking bar and reciprocatory to actuate said bar to lock or unlock the door, a reciprocatory lock controlling member normally engaged by the several latches so that the latter will be reciprocated therewith, an individual solenoid for each latch operable to disengage the same from the reciprocatory member so as to leave any selected door or doors locked while the others are unlocked, and an individual manually operable means for each latch to disengage the same if the electric current fails.

2. In a locking and operating system for cell doors, a lock bar for each door, a latch connected with each locking bar and reciprocatory to actuate said bar to lock or unlock the door, a reciprocatory lock controlling member normally engaged by the several latches so that the latter will be reciprocated therewith, means individual to each latch for disengaging the same from the reciprocatory member so as to leave any selected door or doors locked while the others are unlocked, an individual actuating bar for each door, a reciprocatory door controlling member normally engaging all of said bars to open or close the doors, a bracket rigidly secured to each latch and having a slot in which the respective actuating bar is guided, said bracket being operable to disengage the actuating bar from said reciprocatory door controlling member whenever the latch is disengaged from the reciprocatory lock controlling member.

3. In a locking and operating system for cell doors, a locking bar for each door, a latch connected with each locking bar and reciprocatory to actuate said bar to lock or unlock the door, a reciprocatory lock controlling member having notches normally engaged by the several latches so that the latter will be reciprocated therewith, an individual solenoid for each latch operable to lift the same from the notch so as to leave any selected door or doors locked while the others are unlocked, and individual manually operable means for each latch to lift the same from the notch if the electric current fails, an individual actuating bar for each door, a reciprocatory door controlling member having notches normally engaged by the respective door actuating bars to open or close doors, a bracket rigidly secured to each latch and having a slot in which the respective door actuating bar is guided, said bracket being operable to disengage the door actuating bar from the notch whenever the latch is disengaged from the notch in the lock controlling member.

4. In a locking and operating system for cell doors, a locking bar for each door, a latch connected with each locking bar and reciprocable to actuate said bar to lock or unlock the door, an endless lock controlling member having one side normally engaged by the several latches so that the latter will be moved longitudinally by travel of said endless member, sprocket wheels about which said endless member is guided, means for disengaging any selected latch or latches from the endless member, and means for actuating said endless member to move the remaining latches in either direction.

5. In a locking and operating system for cell doors, a locking bar for each door, a latch connected with each locking bar and reciprocable to actuate said bar to lock or unlock the door, an endless lock controlling member having one side formed with notches normally engaged by the several latches so that the latter will be moved longitudinally therewith, an individual electro-magnetic device for each latch operable to disengage the same from the notch so as to leave any selected door or doors locked while the others are unlocked, and an individual manually operable means to disengage any latch from the notch if the electric current fails.

6. In a locking and operating system for cell doors, an individual locking bar for each door, an individual latch connected with each locking bar and reciprocable to actuate said bar to lock or unlock the door, an endless lock controlling member having one side formed with notches normally engaged by the several latches so that the latter will be moved longitudinally therewith, sprocket wheels about which said endless member is guided, an endless door controlling member similarly mounted and having one side formed with notches, an individual actuating bar for each door normally engaging one of the notches in the door controlling member, a bracket rigidly secured to each latch and having a slot in which the respective door actuating bar is guided, said bracket being operable to disengage the door actuating bar from its notch whenever the latch is disengaged from its notch in the lock controlling member.

7. In a locking and operating system for cell doors, means individual to each door for locking the same either in open or closed position, an endless member, sprocket wheels over which the endless member is guided, mechanism normally connecting one side of the endless member to the respective locking means to move the same to locking or unlocking position as the endless member travels in one direction or the other, means operable from a common point to disconnect from the endless member the mechanism connected with any selected locking means, and means connected with the endless member for moving it in either direction.

8. In a locking and operating system for cell doors, an upright locking bar individual to each door, a bell crank connected to each locking bar, a latch connected to each bell crank, an endless member having one side normally connected to all of the latches, an individual electro-magnetic device for each latch operable when energized to disengage the latch from the endless member, individual manually operated means for disengaging the respective latches in case the electric current fails, and means for moving said endless member longitudinally to actuate the latches which are still connected therewith so as to lock or unlock the corresponding doors.

9. In a locking and operating system for cell doors, an individual locking bar for each door, an individual latch reciprocatory to actuate each locking bar to lock or unlock the door, a reciprocatory lock controlling member normally engaged by all of the latches so that the latter will all be actuated simultaneously, an individual reciprocatory bar connected to each door for opening and closing the same, a reciprocatory door controlling member normally engaged by all of the door operating bars so that the doors may all be actuated simultaneously, means for disconnecting any selected latch or latches from the lock controlling member, means operable by the latch when disconnected to also disconnect the corresponding door opening bar from the reciprocatory door controlling member, means for actuating the lock controlling member to unlock the remaining doors, and means for actuating the door controlling member to open or close the doors.

10. In a locking and operating system for cell doors, an individual locking bar for each door, an individual latch reciprocatory to actuate each locking bar to lock or unlock the door, an endless lock controlling member having one side formed with notches normally engaged by all of the latches so that the latter will all be actuated simultaneously by travel of said endless member in either direction, an individual reciprocatory bar connected to each door for opening and closing the same, a similar endless member controlling the doors and having one side normally engaged by all of the door operating bars so that the doors may all be actuated simultaneously, means for disconnecting any selected latch or latches from the lock controlling member, means operable by the latch when disconnected to also disconnect the corresponding door operating bar from the endless door controlling member, means for causing the lock controlling member to travel in one direction or the other to lock or unlock the remaining doors, and means to cause the endless door controlling member to travel in either direction to open or close the doors.

11. In a locking and operating system for cell doors, means for locking or unlocking any selected combination of doors, a door controlling member reciprocatory to open or close simultaneously the doors which are unlocked, means for operating the door controlling member including a frictional pulley, a motor having a frictional pulley beneath the first-mentioned pulley, said motor being mounted for vertical movement, and a foot lever associated with the motor and operable to raise the same to establish an operative connection between said pulleys.

12. In a locking and operating system for cell doors, means for locking or unlocking any selected combination of doors, a door controlling member, a control box located in front of the cell row substantially midway between the end cells, and means within the control box for actuating the locking means and door controlling member to open or close simultaneously the doors which are unlocked.

13. In a locking and operating system for cell doors, means for locking or unlocking any selected combination of doors, a control box located in front of the cell row substantially midway between the end cells, means within the control box for actuating the locking means, a door controlling member located above the row of cells, means connected therewith to open or close simultaneously the doors which are unlocked, means within the control box for operating the door controlling member including a frictional pulley, a motor having a frictional pulley beneath the first-mentioned pulley, said motor being guided for vertical movement, a foot lever associated with the motor and operable to raise the same and establish an operative connection between said pulleys.

14. In a locking and operating system for cell doors, a locking bar for each door, a latch connected with each locking bar and reciprocatory to actuate said bar to lock or unlock the door, a reciprocatory lock controlling member normally engaged by the several latches so that the latter will be reciprocated therewith, a control box located in front of the cell row substantially midway between the ends thereof, means operable from the control box to disengage any selected latch or latches from the lock controlling member, means in said control box for actuating said lock controlling member to lock or unlock the remaining doors, and means also operable from the control box for opening or closing the doors which are thus unlocked.

15. In a locking and operating system for cell doors, a locking bar for each door, a latch connected with each locking bar and reciprocatory to actuate said bar to lock or unlock the door, a reciprocatory lock controlling member normally engaged by the several latches so that the latter will be reciprocated therewith, a control box located in front of the cell row substantially midway between the ends thereof, means operable from the control box to disengage any selected latch or latches from the lock controlling member, an individual actuating bar for each door, a reciprocatory door controlling member normally engaging all of said door actuating bars to open or close the doors, means for disconnecting any one of said door actuating bars from the door controlling member when the corresponding latch is disengaged from the lock controlling member, means operable from within the control box for actuating the lock controlling member to unlock the remaining doors, and means also operable from the control box to open or close said remaining doors.

16. In a locking and operating system for cell doors, a locking bar for each door, a latch connected with each locking bar and reciprocatory to actuate said bar to lock or unlock the door, a reciprocatory lock controlling member having notches normally engaged by the several latches so that the latter will be reciprocated therewith, a control box located in front of each cell row substantially midway between the ends thereof, means operable from the control box to lift any selected latch or latches from the notch so as to leave the corresponding door locked when the others are unlocked, an individual actuating bar for each door, a reciprocatory door controlling member having notches normally engaged by the respective door actuating bars to open or close the doors, a bracket rigidly secured to each latch and having a slot in which the respective door actuating bar is guided, said bracket being operable to disengage the door actuating bar from the notch whenever the latter is disengaged from the notch in the lock controlling member, means operable from the control box for actuating the lock controlling member to unlock the remaining doors, and means also operable from the control box to actuate the door controlling member to open or close said remaining doors.

17. In a jail having a row of cells and cell doors arranged in substantial alignment, door locking and operating mechanism including a locking bar co-operating with each door; an actuating member connected to the locking bar; a single operating element selectively engaged by the several bar actuating members and adapted to move the engaged members simultaneously to lock or unlock the selected doors; electro-magnetic means co-operating with the several actuating members adapted to be selectively energized to disengage the actuating members from the single operating element so as to leave any selected door or doors locked while the others are unlocked; and means independent of the electro-magnetic means also connected to disengage the actuating members when the solenoids fail to function.

18. In a jail having a plurality of cells, cell door locking and operating mechanism including individual locking members for the respective doors; actuating members connected to the locking members; a single operating device selectively engaged by the several actuating members and arranged to move the engaged members simultaneously to lock or unlock the selected doors; remote controlled electrical means connected and arranged to disengage any selected actuating member from the operating device; and mechanical means also connected to operate said actuating members in case the electrical apparatus fails to function.

19. In a jail having a plurality of cells, cell door locking and operating mechanism including individual locking members for the respective doors; actuating members connected to the locking members; a single operating device selectively engaged by the several actuating members and arranged to move the engaged members simultaneously to lock or unlock the selected doors; and remote control electrical means connected and arranged to disengage any selected actuating member from the operating device.

20. In a jail having a plurality of cells, cell door locking and operating mechanism including individual locking members for the doors; a single operating element selectively connected to actuate the locking members; a series of electrical devices arranged to disengage the operating connections between selected locks and said operating element so that selected doors will remain locked while the others are unlocked; mechanical means also constructed and arranged to control the selective connections in case the supply of current fails; and remote control means for the electrical devices and the mechanical means.

21. In a jail having a plurality of cells, cell door locking and operating mechanism including individual locking members for the doors; a single operating element selectively connected to actuate the locking members; a series of electrical devices arranged to disengage the operating connections between selected locks and said operating element so that selected doors will remain locked while the others are unlocked; a plurality of separate mechanical members also arranged to disengage the operating connections when the electrical devices fail to function; and remote control means for the several solenoids and the mechanical members.

22. In a jail having a plurality of cells, cell door locking and operating mechanism including individual locking members for the doors; a single operating element selectively connected to actuate the locking members; a series of electro-magnetic devices arranged to disengage the operating connections between selected locks and said operating element so that selected doors will remain locked while the others are unlocked; mechanical means also constructed and arranged to control the selective connections in case the supply of current fails; and control means for the electro-magnetic devices and mechanical means arranged in a common control box.

23. In a jail having a plurality of cells, cell door locking and operating mechanism including individual locking members for the doors; a single operating element selectively connected to actuate the locking members; a series of electro-magnetic devices arranged to disengage the operating connections between selected locks and said operating element so that selected doors will remain locked while the others are unlocked; a plurality of separate mechanical members also arranged to disengage the operating connections when the electro-magnetic devices fail to function; remote control means for the several solenoids and the mechanical members; and a single door opening and closing member having provision to be selectively engaged with the unlocked doors.

24. In a jail having a plurality of cells, cell door locking and operating mechanism including individual locking members for the doors; a single operating element selectively connected to actuate the locking members; a series of electrical devices arranged to disengage the operating connections between selected locks and said operating element so that selected doors will remain locked while the others are unlocked; a plurality of separate mechanical members also arranged to disengage the operating connections when the electrical devices fail to function; remote control means for the several solenoids and the mechanical members; a single door opening and closing member having provision to be selectively engaged with the unlocked doors; and means to disengage the opening and closing member from the doors whose lock operating mechanism is disengaged.

25. In a jail having a row of cells and cell doors arranged in substantial alignment, door locking and operating mechanism including a locking bar cooperating with each door; an actuating member connected to the locking bar; a single operating element selectively engaged by the several bar actuating members and adapted to move the engaged members simultaneously to lock or unlock the selected doors; electro-magnetic devices co-operating with the several actuating members adapted to be selectively energized to disengage the actuating members from the single operating element so as to leave any selected door or doors locked while the others are unlocked; means independent of the electro-magnetic devices also connected to disengage the actuating members when the electro-magnetic devices fail to function; a door opening and closing bar; and means on the doors selectively to engage the opening and closing bar constructed and arranged to be disengaged from the bar by said actuating members when they are disengaged from the lock operating element.

26. A selective locking and unlocking system for a series of cell doors comprising, in combination, individual locking members for the several doors; a movable lock controlling member; a series of latch members connected to the lock members and selectively engageable with the lock controlling member; a series of electro-magnetic devices which, when energized to disengage the respective latch members from the lock controlling member so that selected doors may remain locked while the others are being unlocked; and independent mechanism to disengage the respective latch members from the lock control member if the electric current fails.

27. A selective locking and unlocking system for a series of cell doors comprising, in combination, individual locking bars for the several doors; a reciprocatory lock controlling bar guided to move longitudinally; individual reciprocatory latches connected to the lock bars; the connections including pivoted levers arranged to reciprocate the lock bars; said reciprocatory controlling bar having a series of notches normally engaged by the several latches; and remote controlled electrical means which, when energized disengages selected latches from the lock controlling bar so that selected ones of the doors will remain locked while the other doors are unlocked.

28. A selective locking and unlocking system for a series of cell doors comprising, in combination, a longitudinal casing above the doors; door locking bars projecting downwardly from the casing; bell cranks within the casing connected to the locking bars; reciprocatory latch members pivotally connected to the bell cranks to operate the latch bars; a single reciprocatory lock controlling bar having a series of notches; lugs on the latch bars normally engaging the notches; and a series of electro-magnetic devices which, when energized, lift selected ones of the latches out of engagement with the lock controlling bar.

29. A selective locking and unlocking system for a series of cell doors comprising, in combination, a longitudinal casing above the doors; door locking bars projecting downwardly from the casing; a single operating element selectively connected to actuate the locking bars; a series of electro-magnetic devices arranged to disengage the operating connections between selected locks and said operating element so that selected doors will remain locked while the others are unlocked; and remote control means for the electro-magnetic devices.

30. A selective locking and unlocking system for a series of cell doors comprising, in combination, a longitudinal casing above the doors; door locking bars projecting downwardly from the casing; a single operating element selectively connected to actuate the locking bars; electrical means connected and arranged to disengage the operating connections between selected locks and said operating element; and means to operate said electrical means located at a single control station.

31. A selective door locking and operating system for a series of cell doors arranged in a row, comprising in combination, locking members for the respective doors; levers connected to the locking members; operating latches pivoted to the levers; a single reciprocatory lock controlling bar normally connected to said latches; a series of electro-magnetic devices each co-operating with a latch and adapted to be energized to disengage selected ones of the latches from the controlling bar so that the selected doors will remain locked while the others are being unlocked; a single reciprocatory door operating member selectively connected to the doors; and means to disengage the operating connections between the door operating member and the selected doors which are to remain locked when the electro-magnetic devices disengage the lock operating latches; and remote control means for said electro-magnetic devices said lock controlling bar and said door operating member.

32. In a locking and operating system for the cell doors of a row of cells; electrically controlled means including mechanism for locking and unlocking any selected door or combination of doors; a door operating member; a control box at one end of the row of cells; and electrical means within the control box for controlling the locking mechanism and the door operating member.

33. In a locking and operating system for a series of cell doors, locking members for the respective doors; a single control member for the locks; electrical means arranged to disconnect the control member from selected locks; a door operating member normally connected to the several doors and also arranged to be disengaged from the selected doors which are to remain locked; a motor for actuating the door operating member and a series of switches arranged near the motor to control the electrical connections.

34. In a locking and operating system for a series of cell doors; a reciprocatory door controlling and operating member normally connected to all of the doors and having means to be selectively disengaged therefrom; an electric motor connected to move the controlling and operating member; and means connected to control the driving connection between the motor and said member.

35. In an operating system for a series of cell doors; a reciprocatory control member; means operatively connecting the doors to the control member; electrical means having mechanism selectively to disengage the operating connections between the doors and the control member so that selected doors will remain closed while the others are being opened; gearing operatively connected to actuate the control member; and a driving motor arranged to be operatively connected to said gearing.

36. In a lock operating system for a series of cell doors, locking members for the respective doors; an endless lock controlling member co-operating with all of the locks; and actuating mechanism operatively connecting the lock controlling member to the locking members.

37. In a lock operating system for a series of cell doors, locking bars associated with the respective doors; an endless lock controlling member co-operating with all of the locks; latch means operatively connecting the locking bars to the controlling member; selectively operable means connected to disengage the latch means for any lock or combination of locks; and manual operating means connected to the controlling member.

38. In an operating system for a series of cell doors, an endless control member; movable means normally connecting all of the doors to the control member; selector mechanism having means to disengage the several connections; and an actuating member operatively connected to the control member.

39. In an operating system for a series of cell doors, an endless control member; movable means normally connecting all of the doors to the control member; selector means co-operating with the control member to disengage the several connections; and an electric motor arranged to actuate the control member.

40. In a locking and operating system for a series of cell doors, locking bars for the respective doors; an endless lock control member; means operatively connecting the lock control member to the locking bars; means selectively to disengage the connections so that selected locking bars will not be operated; an endless door controlling member operatively connected to all of the doors; means to effect disengagement of the connections between the door controlling member and the doors when the operating connections between the locking bars and the lock controlling member are disengaged; and remote control means to actuate both of said endless control members.

In testimony that I claim the foregoing as my own, I have hereunto affixed my signature.

DAVID FRANKLIN YOUNGBLOOD.